United States Patent [19]

Marshall et al.

[11] Patent Number: 4,857,261
[45] Date of Patent: Aug. 15, 1989

[54] REACTOR VESSEL HEAD AREA MONITORING SYSTEM

[75] Inventors: James R. Marshall, Penn Hills; Mary F. Thorn, Monroeville, both of Pa.

[73] Assignee: Westinghouse Electric Corp., Pittsburgh, Pa.

[21] Appl. No.: 238,380

[22] Filed: Aug. 31, 1988

[51] Int. Cl.[4] .............................................. G21C 17/00
[52] U.S. Cl. ................................. 376/248; 376/249; 376/250; 358/100
[58] Field of Search ............... 376/248, 249, 245, 259, 376/250; 358/100

[56] References Cited

U.S. PATENT DOCUMENTS

| | | | |
|---|---|---|---|
| 4,518,560 | 5/1985 | Takaku et al. | 376/245 |
| 4,591,996 | 5/1986 | Vachon | 376/248 |
| 4,643,867 | 2/1987 | Hornak et al. | 376/248 |
| 4,656,509 | 4/1987 | Matsuyama et al. | 376/250 |
| 4,688,087 | 8/1987 | Ams et al. | 358/100 |
| 4,724,479 | 2/1988 | Schmalfuss et al. | 376/248 |
| 4,787,715 | 11/1988 | Ahmed et al. | 376/248 |

Primary Examiner—Harvey E. Behrend
Attorney, Agent, or Firm—Michael G. Panian

[57] ABSTRACT

System provides a positive verification of the presence of a reactor coolant leak in the reactor vessel head area, identifies its location, and enables its size to be determined. A series of video cameras 28 strategically placed about the shroud 16 on the vessel head 13 provide complete viewing coverage. Variable intensity halogen lamps 46, 47 provide illumination for the area to be inspected. The equipment is specially adapted for use in a highly irradiated environment. The system 25 allows for inspection of the reactor vessel head area without the need for shutting down the plant.

20 Claims, 2 Drawing Sheets

REACTOR VESSEL HEAD AREA MONITORING SYSTEM

TECHNICAL FIELD

The invention relates to nuclear reactor vessels, and more particularly to a reactor vessel head area monitoring system.

BACKGROUND OF THE INVENTION

In a typical nuclear reactor power plant, a nuclear reactor vessel is used to generate heat for the production of steam and electricity. In one such design, the reactor vessel is a pressure vessel which encloses the core of nuclear fuel and coolant, typically borated water. As a means for generating data relating to the operating conditions within the pressure vessel, instrumentation devices are introduced to the nuclear core through ports or penetrations in the vessel. Some of these penetrations are provided for through the reactor vessel closure head. The closure head may also include penetrations for drive mechanisms of control rods, used to regulate the rate of nuclear reactions which take place within the core, and in turn control the power output of the plant.

Although these ports are mechanically sealed to prevent the inadvertent leakage of coolant from the reactor vessel, the operating conditions of a nuclear reactor pressure vessel require additional safeguards. Typically, the pressure vessel maintains the coolant therein at an internal pressure of about 15 MPa (2250 psi) and a temperature of about 315° C. (600° F.). Because of such a large internal pressure, reactor coolant may leak from the mechanical joint of these penetrations, or when control rods are withdrawn.

The coolant within the reactor vessel is slightly acidic and highly corrosive due to the presence of boric acid which is dissolved within the coolant. Boric acid is a neutron absorber used as a variable reactivity control over the long-term operation of the plant. Even though there are regulatory limits on the allowable amount of coolant which may be emitted from the reactor vessel, components on the exterior of, and in close proximity to, the reactor vessel head need to be periodically inspected to determine if coolant is being emitted.

Since an operating nuclear reactor generates an irradiated environment, the inspection and/or maintenance of the reactor vessel head area is typically conducted at times when the reactor is shut down for normal inspection or maintenance procedures, such as refueling of the core. A usual telltale sign of the presence of a leak in this area is white boric acid crystal deposits on the reactor vessel head. Any of several methods for determining the presence of a possible leak source may be used, but verification of the existence of a leak, estimations of its size, and the identification of its location is best done visually. Generally, the control rod drive mechanisms and instrumentation ports are enclosed by a cooling shroud. This shroud provides protection for the drive mechanisms, as well as a means for directing the flow of air around the ports for natural circulation cooling of the ports and drive mechanisms. This can make it even more difficult to visually detect the presence of borated coolant in this area.

DISCLOSURE OF THE INVENTION

It is therefore an object of the present invention to provide a means for remotely monitoring the area around a reactor vessel closure head to detect the presence of borated coolant.

It is another object of the present invention to provide a monitoring device which is remotely operable during reactor operation.

The above objects are attained by the present invention, according to which, briefly stated, in a nuclear reactor pressure vessel having a removable closure head with a plurality of ports projecting therethrough, and an upwardly extending cooling shroud enclosing the ports, the shroud having a plurality of openings therein, a reactor vessel head area monitoring system comprises a series of video cameras attached to the shroud adjacent the openings. A wide angle, right angle lens is operably attached to each video camera such that it receives video images of the reactor vessel head area. A light source is attached to the shroud adjacent to the video camera to provide adequate lighting for the cameras in detecting the presence of boric acid crystals on the reactor vessel head.

BRIEF DESCRIPTION OF THE DRAWINGS

Various other objects, features and advantages of the invention will become more apparent to those skilled in the art by reading the following detailed description in conjunction with the drawings, which are shown by way of example only, wherein.

DESCRIPTION OF THE PREFERRED EMBODIMENT

Figure 1:
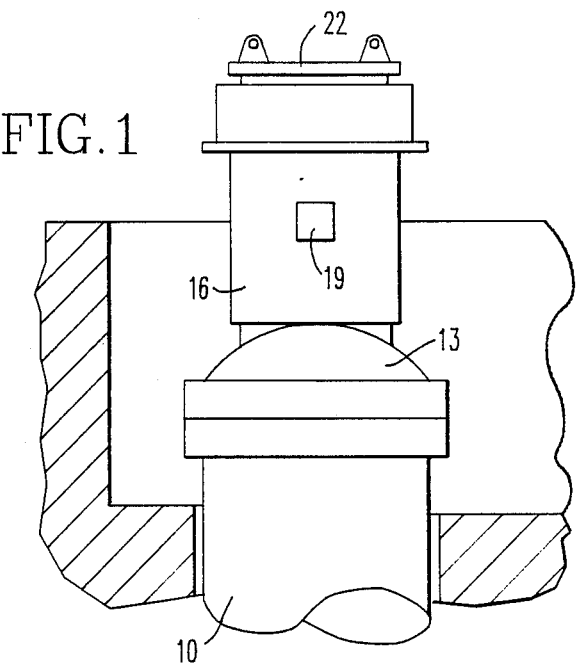
FIG. 1 is a view, partially in side elevation, and partly diagrammatic of a typical nuclear reactor pressure vessel.

Referring now to the drawings in detail, FIG. 1 shows a partial side elevation view of a typical nuclear reactor pressure vessel 10. The pressure vessel 10 includes the closure head 13 and an upwardly extending cooling shroud 16 thereon. The cooling shroud 16 has a plurality of openings 19, which can be either access doors or viewing windows, located around its circumference. On top of the cooling shroud 16 is a missile shield 22 for protecting the control rod drive mechanisms and instrumentation ports (not shown).

Figure 3:
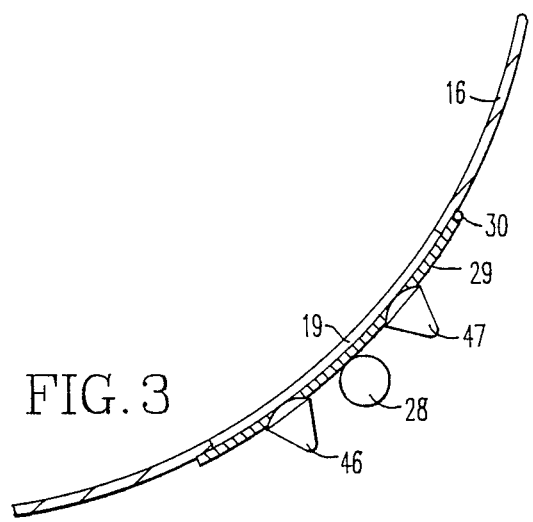
FIG. 3 is a partial plan view of the video monitoring system attached to the cooling shroud.
Figure 2:
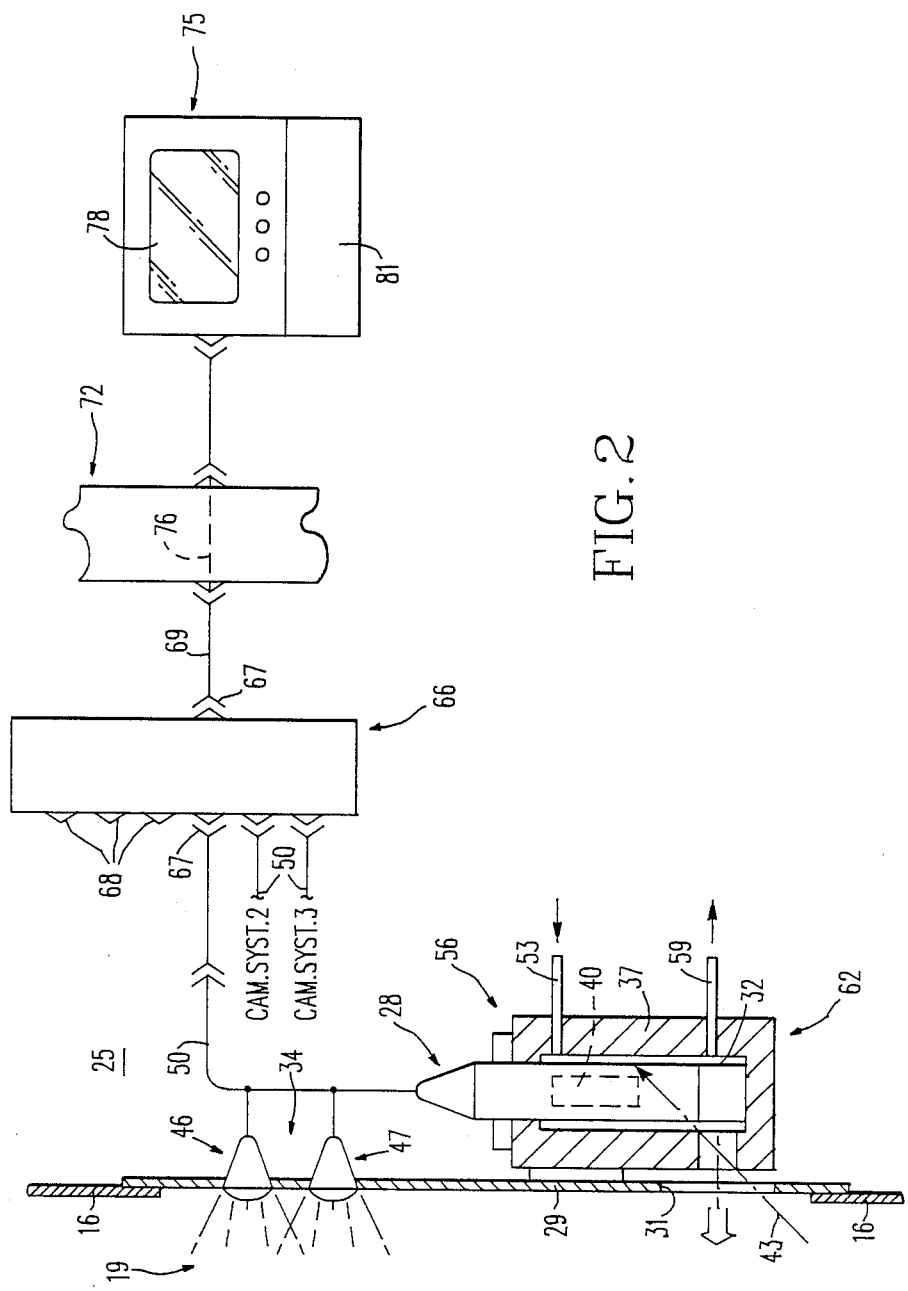
FIG. 2 is a schematic representation of a video inspection system of the present invention.

Mounted on the cooling shroud 16 so as to view the reactor vessel head area is the reactor vessel head area monitoring system 25 of the present invention. See FIGS. 2 and 3. Preferably the monitoring system 25 is attached to the cooling shroud 16 around its circumference at areas adjacent the openings 19. The monitoring system 25 includes a video camera 28 attached to the shroud 16 Preferably the camera 28 is attached to an access door 29, which may be connected to the shroud 16 by means of a hinge 30, on the exterior surface thereof The door 29 has an aperture 31 through which the camera 28 receives video images of the interior of the cooling shroud 16 In this manner, maintenance on the video camera 28 or other components is facilitated A right angled lens 32 is attached to the video camera 28 such that the camera receives video images from the interior of the shroud area, or the reactor vessel head area. Since the camera 28 is preferably vertically oriented on the shroud 16 so as to occupy as little room as possible, a right angled lens 32, or other suitable lens having a wide angle field of view, will provide maximum viewing area. Attached to the shroud opening 19 adjacent to the video camera 28 is a light source 34, preferably comprising two halogen lamps which are variable in intensity, for reasons which will be more fully explained hereinafter.

If need be, the camera 28 may be enclosed within a case 37 constructed of neutron shielding material, should the camera 28 need to be placed in areas of high neutron activity. Here, too, the right angled, wide angled lens 32 provides an important advantage in that the most sensitive element of the camera, its electronics 40, is protected from bombardment by neutrons along the neutron transport path, as indicated by dashed line 43 in FIG. 2 Alternatively, the camera 28 can be one which has been radiation hardened, such as the ETV-1250 TV Camera, manufactured by the Imaging and Sensing Technology Corporation.

Preferably, the light source 34 comprises two halogen lamps 46 and 47; one lamp 46 is a primary light source and the other lamp 47 is a backup should the first one fail. Since the interior area of the reactor vessel cooling shroud 16 is quite dark, the halogen lamps 46, 47 will provide adequate lighting for the remote monitoring system 25. Preferably the power source for the camera 28 and the light source 34 are provided by a single cable 50. Also, the video camera 28 and lamps 46, 47 are releasably secured to the cooling shroud 16 so that they can be quickly removed should they need to be serviced or replaced.

Since the ambient temperature around the reactor vessel 10 is relatively high, a means for supplying cooling air around the video camera 28 is provided. Cooling air, preferably plant air under pressure, is circulated around the camera 28, even if it is enclosed within the neutron shielding case 37, through an inlet 53 near an upper end 56 of the video camera 28. The air circulates around the camera 28, including its sensitive electronics 40, and outward through an outlet 59 near a bottom end 62.

Preferably a plurality of such video cameras 28 and light source 34 systems are provided around the circumference of the cooling shroud 16 to provide for complete viewing of the interior of the shroud area, as well as all of the instrumentation ports and control rod drive mechanisms projecting through the vessel head 13. For most plants, three such cameras 28 are sufficient to provide complete viewing, although if need be more cameras may be provided. The cable 50 for the camera 28 and light source 34 is connected to a switching and multiplexer unit, designated as at 66, by a quick disconnect plug 67. The multiplexer unit 66 has a plurality of ports 68 to which additional monitoring systems 25 and/or lamps 46, 47 can be connected. The switching and multiplexer unit 66 allows an operator to select which video camera 28 is to be operating to inspect a particular area of the reactor vessel head. Also the particular lamp 46, 47 which is to be illuminated can be individually chosen for reasons which will become readily apparent.

While a plurality of cables 50 connect to the switching and multiplexer unit 66, one for each video camera 28 and light source 34, preferably only one power cable 69 passes through the containment wall 72 of the nuclear power plant connecting to a control unit 75 disposed within a control room of the plant, forming a single penetration 76 in the containment wall 72. Preferably, most of the elements of the system are situated within the control room and not in the containment area. This way, should any of the elements need servicing, it is not necessary for personnel to enter into the irradiated environment of the containment building. Also, the number of penetrations 76 required in the containment wall 72 are to be kept at a minimum.

Included with the control unit 75 is a video display 78, as well as a means 81 for retrievably storing the video images received through the video cameras 28. Preferably the storage means 81 is a video cassette recorder, or alternatively a camera to provide a snapshot of the reactor vessel head area. In this manner, should an instrumentation port or control rod drive mechanism be detected to have a leak, its condition over time can be monitored by viewing and comparing the videotapes or photographs to detect any change over the operating period of the reactor vessel 10.

The control unit allows the operator to not only select which video camera 28 is operable, but also the lamp 46, 47 for each camera which is to be illuminated and its intensity as well. While only one camera 28 may be operable to send video images to the display unit 78, more than one light source 34 can be illuminated so as to allow for a unique lighting characteristic to be provided for within the interior area of the cooling shroud 16.

To adequately and extensively view the interior area of the cooling shroud 16, the reactor vessel head area monitoring system 25 is preferably operated in the following manner:

When it is desired to view the vessel head area, and just prior to activating the desired video camera 28, cooling air is circulated around the body of the camera 28. This will lower the temperature around the camera and dissipate heat from the electronics 40 as a particular camera 28 is operated. After a predetermined period, the video camera 28 is activated as well as one or more of the halogen lamps 46, 47. As the operator views the interior of the cooling shroud 16, a unique feature of the device allows the operator to view images similar to a three dimensional picture. The operator can selectively choose not only which lamp is illuminated, but its intensity level as well. By doing so, different types of shadowing patterns will be produced around the instrumentation ports and control drive mechanism housings. Should boric acid crystals be present on the reactor vessel head 13, these would also produce differing shadow patterns. By selectively choosing the light source 34 which is to be illuminated and its intensity, a relative indication of the size of any leak present can be determined by the amount of boric acid which may have accumulated on the reactor vessel head 13 around a particular port.

When the operator has effectively viewed a particular area and recorded the video images received, the operator can selectively choose the next camera 28 and light source 34 to be energized. The above method is then performed for all of the monitoring systems 25 provided on the shroud 16 to view the entire reactor vessel head area. After the entire area has been inspected, the operator will have determined if any leaks are present and if so, whether they require immediate attention.

If the amount of leakage is below that requiring immediate action, the operator will nonetheless have been alerted to the condition present. This way any such leak that is determined can be more closely monitored to determine if conditions have changed from time to time. For example, if a plant operator would normally perform such inspection for a particular plant on the order of once a month, if a leak is detected, monitoring can be performed much sooner. That is, the monitoring can be performed either weekly or daily so that should the size of the leak change, necessary steps can be taken to perform the necessary maintenance procedure. Also, the plant operator can prepare to take measures to repair the leak at the next scheduled maintenance outage, such as for refueling, for the plant. In this way, it is not necessary to shut down the plant at an unscheduled period of time, thereby saving the plant operator those costs associated with downtime of the reactor.

Should the openings 19 within the cooling shroud 16 at any particular plant be viewing windows instead of access doors 29, the monitoring system 25 can be secured thereto in an alternative manner. The video cameras 28 and lamps 46, 47 may be secured to the exterior surface of an adapter plate (not shown) which replaces the existing viewing windows.

While specific embodiments of the invention have been described in detail, it will be appreciated by those skilled in the art that various modifications and alterations would be developed in light of the overall teachings of the disclosure. Accordingly, the particular arrangements disclosed are meant to be illustrative only and not limiting as to the scope of the invention, which is to be given by the full breadth of the appended claims and in any and all equivalents thereof.

What is claimed is:

1. In a nuclear reactor pressure vessel having a removable closure head with a plurality of ports projecting therethrough, and an upwardly extending shroud enclosing said ports, the shroud having a plurality of openings therein, a reactor vessel head area monitor comprising:
   (i) a video camera attached to the cooling shroud adjacent one of said openings;
   (ii) a lens operably attached to the camera such that the video camera receives video images of the reactor vessel head area within the shroud; and
   (iii) a light source attached to the shroud for illuminating the reactor vessel head area.

2. The reactor vessel head area monitor as recited in claim 1, wherein the light source comprises a plurality of lamps, each having a variable intensity, disposed about the circumference of the shroud, means for selectively illuminating each lamp, and means for varying the intensity of said lamps when illuminated.

3. The reactor vessel head area monitor as recited in claim 1, further comprising a case constructed of neutron shielding material, the case enclosing the camera and having an aperture therein such that the lens receives video images therethrough.

4. The reactor vessel head area monitor as recited in claim 3, further comprising means for circulating a flow of air around the video camera to dissipate heat therefrom.

5. The reactor vessel head area monitor as recited in claim 1, further including means for displaying said video images received by the video camera.

6. The reactor vessel head area monitor as recited in claim 5, further including means for retrievably storing said video images received by the video camera.

7. The reactor vessel head area monitor as recited in claim 1, wherein said openings in the shroud are viewing windows, the video camera being attached on an exterior surface thereof so as to receive video images of said ports of the reactor vessel head area.

8. In a nuclear reactor pressure vessel having a removable closure head with a plurality of ports projecting therethrough, and a shroud extending upwardly from said closure head and enclosing said ports, the shroud having a plurality of doors thereon and having an aperture therethrough, a reactor vessel head area monitoring system comprising:
   (i) a plurality of video cameras, one each attached to one of said doors of the shroud adjacent the aperture;
   (ii) a wide angled lens operably attached to each video camera such that said video cameras receive video images of the reactor vessel head area;
   (iii) a plurality of lamps for illuminating the reactor vessel head area, each of said lamps having a variable intensity, attached to each of said doors, two each attached adjacent to each video camera, one on either side of said video camera;
   (iv) means for selectively illuminating said lamps;
   (v) means for selectively varying the intensity of said illuminated lamps; and
   (vi) means for individually energizing each of said video cameras.

9. The reactor vessel head area monitoring system as recited in claim 8, further comprising a case constructed of neutron shielding material enclosing each said video camera.

10. The reactor vessel head area monitoring system as recited in claim 9, further comprising means for circulating a flow of cooling air around each of said video cameras.

11. The reactor vessel head area monitoring system as recited in claim 8, further comprising means for displaying said video images received by each of said video cameras.

12. The reactor vessel head area monitoring system as recited in claim 11, further comprising means for retrievably storing said video images received by each of said video cameras.

13. The reactor vessel head area monitoring system as recited in claim 12, further comprising a case constructed of neutron shielding material enclosing each said video camera.

14. The reactor vessel head area monitoring system as recited in claim 13, further comprising means for circulating a flow of cooling air around each of said video cameras.

15. A method of monitoring a closure head of a nuclear reactor pressure vessel, the closure head having a plurality of ports projecting therethrough, and a shroud extending upwardly from said closure head and enclosing said ports which are monitored, the shroud having a plurality of openings therein, the method comprising the steps of:
   (i) positioning a plurality of video cameras on said shroud adjacent to said openings;
   (ii) attaching a wide-angled lens to each of said video cameras such that said video cameras receive video images of the reactor vessel head area therethrough;
   (iii) placing a plurality of lamps, each having a variable intensity, adjacent to said video cameras for illuminating said ports;
   (iv) selectively illuminating at least one of said lamps;
   (v) selectively varying the intensity of said illuminated lamps; and (vi) individually energizing each of said video cameras to receive video images of the entire reactor vessel head area.

16. The method as recited in claim 15, including the step of shielding each of said video cameras within a case of neutron shielding material, the case having an aperture therein such that the video camera receives video images therethrough.

17. The method as recited in claim 16, further including the step of directing a flow of air around each of said video cameras to dissipate heat therefrom.

18. The method as recited in claim 15, further including the step of displaying said video images received by each of said video cameras.

19. The method as recited in claim 18, further including the step of retrievably storing said video images received by each of said video cameras.

20. The method as recited in claim 19, further including the step of directing a flow of air around each of said video cameras to dissipate heat therefrom.

* * * * *